March 31, 1964   R. A. McCULLOUGH   3,126,992
ADJUSTABLE CHUTE
Filed Oct. 31, 1961
Fig. 1.
Fig. 2.
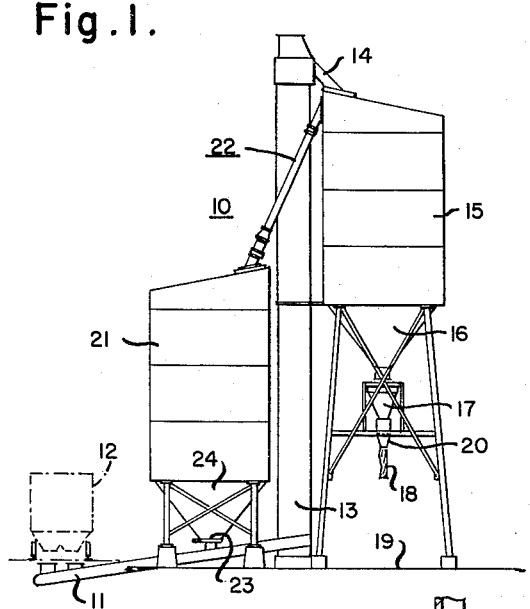
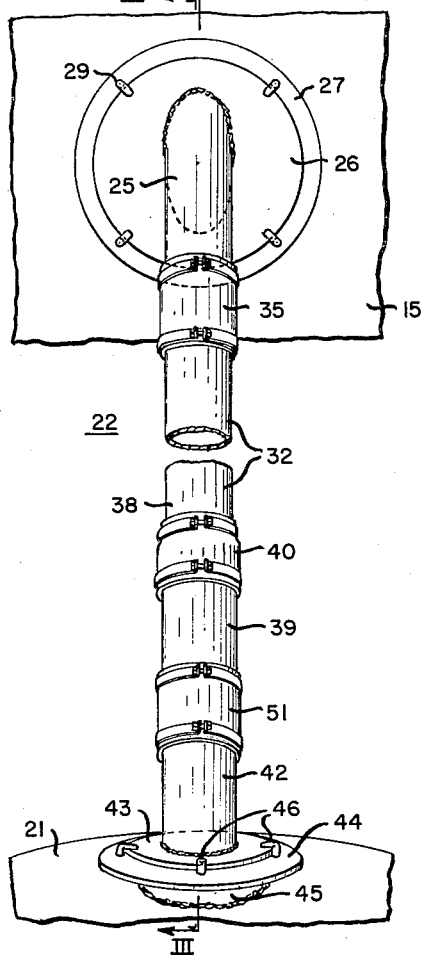
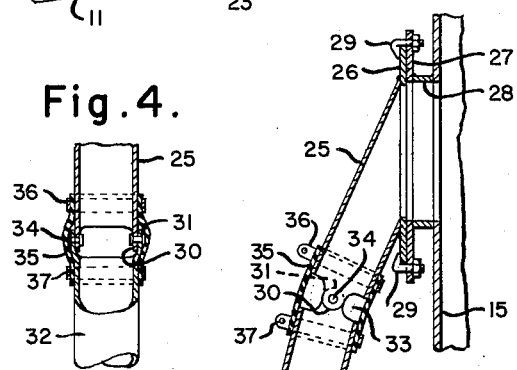
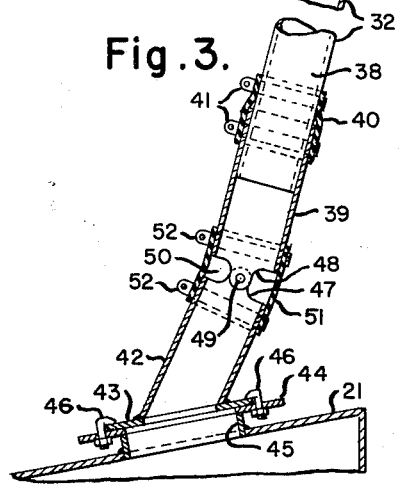
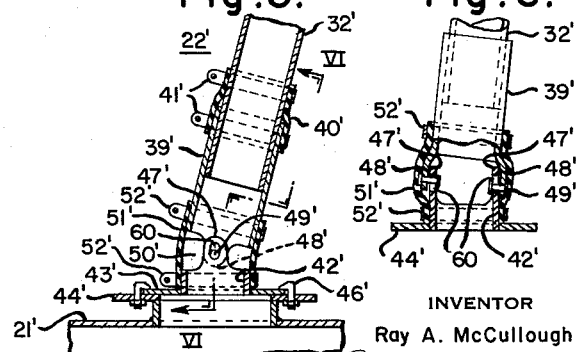
Fig. 3.
Fig. 4.
Fig. 5.
Fig. 6.
INVENTOR
Ray A. McCullough //  
United States Patent Office 3,126,992  
Patented Mar. 31, 1964

3,126,992  
ADJUSTABLE CHUTE  
Ray A. McCullough, Oakmont, Pa., assignor to Blaw-Knox Company, Pittsburgh, Pa., a corporation of Delaware  
Filed Oct. 31, 1961, Ser. No. 149,113  
6 Claims. (Cl. 193—16)

This invention relates to an adjustable chute or the like useful for connecting equipment items for the flow of material therebetween. More particularly, this invention relates to a chute device which may readily be adjusted in length and as to alignment between installed equipment items, such as those used for storage and discharge of bulk construction materials, despite variations in the precise relative positioning of such equipment, or differences in the capacity or shape thereof.

In the construction of bulk material plants such as a batching cement plant installed in the field, either on a permanent or on a temporary removable basis, numerous problems have arisen respecting the chute connection between parts thereof, e.g., when there is a storage bin and a batching delivery bin to be connected by a chute, or when the capacity of the plant so ordered involves a change in the size or shape of the vessels requiring such connection. It was usual heretofore to fabricate a metal chute for such purpose of circular and/or rectangular section with integral flanges welded thereto at the respective ends for attachment to flanges or other connections on the respective vessels to be connected together. Often costly field changes were required at the site because of variations in vertical or horizontal distance and/or alignment between members to be connected by such a chute, or changes in the orientation of one such member relative to the other, occurring in the course of erection even though following carefully prepared construction drawings. Moreover, bulk plants normally come in a number of sizes with each often somewhat different in horizontal and/or vertical spacing between the respective connections to be bridged by the chute, or in the angular positioning thereof. Heretofore again, such commonly required individual fabrication of each particular chute assembly with only minor physical differences therebetween.

A chute device of this invention is adjustable orientation-wise for differences in horizontal and vertical spacing between members to be connected thereby and also for angular variations from vertical alignment in the case of a gravity descent chute device, with, preferably, adjustability in length, capable of accommodating a range of plant sizes and capacities for connection thereof by a chute device of this invention of relatively standardized size. Moreover, chute devices of this invention despite such adjustment do not obstruct free flow of materials to be passed therethrough and are constructed substantially entirely of strength materials such as metal pipe and provided with flange devices at the respective ends thereof for attachment to the vessels or other items of equipment between which such chute device is to extend and be connected. Thereby, deficiencies of prior devices have been overcome by this invention.

Other objects, features and advantages of this invention will be apparent from the following description and the accompanying drawings, which are illustrative only, in which FIGURE 1 is a view in elevation illustrating one form of portable bulk cement plant utilizing one chute embodiment device of this invention;

FIGURE 2 is a front view of the chute device shown in FIGURE 1;

FIGURE 3 is a view in section of such chute device taken along line III—III of FIGURE 2;

FIGURE 4 is a view partly in section of a hinge portion of the chute device shown in FIGURES 1 to 3;

FIGURE 5 is a view of a modified lower end of a chute device of this invention; and FIGURE 6 is a view in section taken along line VI—VI of FIGURE 5.

Referring to FIGURES 1 to 4 of the drawings, there is illustrated therein a portable bulk cement plant 10 comprising an undertrack conveyor 11 adapted to unload bulk cement from a hopper car 12 and deliver it by means of an enclosed endless screw to the entrance of chain bucket elevator 13 which raises and discharges such cement through a spout 14 into a main batching bin 15 for metered delivery through a hopper 16 and weigher device 17 to a discharge outlet 18. A roadway 19 extends beneath outlet 18 so that trucks or other vehicles may stand thereunder to receive a predetermined amount of cement, or other bulk material or materials, from outlet 18 when a valve 20 is opened for that purpose. A storage bin 21 is connected to the top of bin 15 by a chute device embodiment 22 of this invention. As illustrated, as bin 15 reaches a filled condition, overflow material will flow automatically through chute 22 into storage bin 21. If, as and when material is to be transferred from the storage bin 21 back to the batching bin 15, a gate 23 may be opened to gravity feed the bulk material in bin 21 through a hopper 24 for such return by way of conveyor 11 and elevator 13 to bin 15.

Chute 22 in the illustrated embodiment is a continuous relatively rigid conduit having an entry section 25 of rigid metal or composition pipe or of suitable strength with the upper edge thereof secured to a vertical circular flange 26 adapted to be clamped to flange 27 of an overflow outlet fitting 28 attached to bin 15. L-shaped clamping bolts 29 may be utilized to secure flanges 26 and 27 together, suitable gaskets being used when desired between such flanges for sealing.

The lower end of entry section 25 is provided with laterally spaced downwardly extending ears 30 to coact with overfitting parallel laterally spaced upwardly extending ears 31 respectively belled outwardly at the upper end of a conduit run section 32 of rigid pipe to provide a hinge zone 33, the respective pairs of ears to each side of the axis of the chute conduit sections having axially aligned openings for hinge pins 34 pivotally joining the respective ears on each side of the chute axis, with the axis of the hinge pins intersecting said chute axis substantially at right angles thereto and generally level in the illustrated embodiment. The belling of one of the pairs of projecting ears of hinge 33, keeping the other pair of the same diameter as the diameter of the pipe intergral therewith, avoids constriction of the inside diameter and of the opening through chute 22. A flexible boot 35 of rubber, rubberized canvas, or other suitable material covers the hinge zone and the circumferential gaps between the respective sets of projecting ears to maintain a complete closure from one end of chute 22 to the other. Boot 35 has its upper edge secured to the lower end of section 25 by a clamping ring 36 and a similar clamp ring 37 holds the lower end of boot 35 to the upper end of run section 32. Being flexible, cover 35 does not interfere with the adjustment or articulation of the two sections about the hinge axis. The terms "upper" and "lower," "vertical" and "horizontal," and other such terms of direction are used herein in a relative, rather than in an absolute, sense.

Run section 32 comprises an inner pipe portion 38 and an outer pipe portion 39 in telescoping relation to each other for length and relative rotation adjustment. Portion 38 may be enough smaller in diameter than the diameter of outer portion 39, if desired, to provide some clearance therebetween when the two are in telescoping relation. A flexible sleeve 40 like boot 35 is provided covering the telescopic joint between inner and outer portions 38 and 39 with the upper and lower portions of the sleeve fixed to the section portions by clamping rings 41 respectively.

A conduit exit section 42 of rigid pipe is provided in chute 22, the lower end of section 42 being welded to a circular flange 43 for attachment to a flange 44 of an inlet fitting 45 on the top of bin 21, the two flanges being clamped together, with or without gaskets therebetween as desired, by clamping bolts 46 similar to bolts 29. Portion 39 of section 32 is provided with ears 48 like ears 30 to coact with respective belled ears 47 on the upper end of section 42 like ears 31, hinge pins 49 joining them respectively in the manner of hinge pins 34 to provide a lower hinge 50 comparable to hinge 33. Although the hinge axis of hinge 50 is parallel to the hinge axis of hinge 33; or, if more "universal" action is desired, the axes of the respective hinges 33 and 50 may be positioned at right angles to one another which in the case of the illustrated embodiment would place one such hinge axis normal to the plane of the drawing paper and the other in such plane. A flexible boot 51 covering hinge 50 is held in place by clamping rings 52 and is secured to the respective sections in the manner of boot 35.

In operation, chute device 22 thus provides extensive articulation to accommodate either inadvertent or deliberate changes in the distance between the fittings 28 and 45, either vertically or horizontally, or both. Further, changes in the included angle between the planes of the flanges such as flanges 27 and 44 are adjusted to without difficulty by some movement of the telescoping portions of section 32 of chute 22 and/or movement of one or both of the hinges as the case requires. Further, tilting of either of the flanges 27 and/or 44 to some extent about an axis lying in or out of the plane of the drawings can be accommodated by chute 22 by virtue of the rotatable circular periphery of the flanges 26 and 43 and/or the ability of the upper and lower portions 38 and 39 of run section 32 to turn about the longitudinal axis of that section.

FIGURES 5 and 6 illustrate a somewhat modified embodiment of this invention in which parts corresponding generally in construction and functioning to parts of the previously described embodiment herein are provided with the same reference numerals with the addition of a prime accent thereto. Thus, in chute device 22′, exit section 42′ is short and has a flange 43′ welded to the pipe thereof at right angles thereto to coact with a horizontal flange 44′ on vessel 21′. Additionally, the modification of FIGURES 5 and 6 is so constructed that the laterally spaced downwardly extending ears 48′ are the ones that are belled outwardly while the laterally spaced upwardly extending ears 47′ have the same diameter as the pipe of section 42′. In addition, each of the ears 47′ has an opening 60 in axial registry with the hinge axis of hinge 50′ to coact with the hinge pins 49′ in the manner of a loose connection inasmuch as the openings 60 are elongated. Thereby, hinge 50′ provides not only for hinging about the axis of the pins 49′ but also enables the respective axes of the sections 32′ and 42′ to be tilted in the plane of the drawing paper as illustrated in FIGURE 6 for additional articulation provision in an embodiment of this invention whenever such may be desired.

Such relatively universal action of a new chute assembly of this invention is obtained without sacrifice of the relatively rigid and strong conduit character of a solid custom-made chute. And, chutes of this invention may be prefabricated and will not only fit well where there are unintended construction variations but may also be used when a plant involves a different capacity or size of arrangement so that one size of chute device of this invention may accommodate several plants varying in one or more of the characteristics named. Or, chute devices of this invention also may be made up partially in advance without flanges in a manufacturer's shop and the entry or exit sections, or both, cut to desired length and angle and the respective flanges therefor welded thereto at such shop or in the field, as may be desired.

Various changes may be made in the illustrated embodiment and modification and further details added or omitted, and other embodiments provided, without departing from the spirit of my invention or the scope of the appended claims.

I claim:

1. An adjustable chute device comprising, in combination, an entry conduit section, an exit conduit section and a run conduit section extending therebetween, longitudinally projecting and diametrally positioned overlapping ears at a hinge end of each said section adjoining another section and respectively in transverse registry, said overlapping ears being transversely spaced to avoid constricting the internal diameter of said sections, adjoining overlapping ears at each hinge end being pivotally and directly connected together to form a single-axis hinge, flexible boots covering said hinges with the edge portions of said boots respectively fastened to the adjacent ends of the respective sections forming said hinge, said run conduit section being hingedly connected at its respective end portions by said hinges to said two first-named sections respectively, said two first-named sections further having circular flanges at the outer ends thereof for attachment of the respective ends of said chute device, said run conduit section having coaxial portions capable of telescoping and of relative rotation, a flexible sleeve covering the joint between said telescoping portions with the edge portions of said sleeve respectively fastened to adjacent ends of said telescoping portions.

2. An adjustable chute device as set forth in claim 1, in which said conduit sections are made of rigid pipe lengths, said overlapping ears are in pairs on opposite sides of each section, each pair being separately connected by a hingepin, the hinge pins at one hinge being generally parallel to those at another.

3. An adjustable chute device as set forth in claim 2, comprising, further, said overlapping ears having openings in transverse registry in each of said hinges and said hinge pins passing through said openings in the respective ears in overlapping relation, the axes of said hinge pins at said respective hinges being coincidental and said boots entirely enclosing said hinges inclusive of said hinge pins, said boots being fastened to said sections respectively by clamping rings.

4. An adjustable relatively rigid chute adapted to be supported by its ends comprising, in combination, an entry tubular wall conduit section, an exit tubular wall conduit section and at least one tubular wall conduit run section therebetween defining a chute opening therethrough, projecting means at the end of each section adjoining another section, said projecting means of each section being integral with and on opposite sides of said wall and pivotally connected substantially only to the adjoining projecting means of the adjoining section to form a hinge without passing across the opening through said sections, said projecting means of each section further being longitudinally extending ears, the respective ears on adjoining end of respective sections being overlapping, the ears nearer to the axis of each section being spaced apart a distance generally equal to the internal transverse distance between said opposite sides of said wall and the ears farther from said axis being belled outwardly to avoid constricting the interior cross section of said sections, means covering said hinges in any position thereof, and relatively flat means at the outer ends of said two first-named sections for support attachment thereby of the respective ends of said chute.

5. An adjustable relatively rigid chute adapted to be supported by its ends comprising, in combination, an entry tubular wall conduit section, an exit tubular wall conduit section and at least one tubular wall conduit run section therebetween defining a chute opening therethrough, projecting means at the end of each section adjoining another section, said projecting means of each section being integral with and on opposite sides of said wall and pivotally connected substantially only to the adjoining projecting means of the adjoining section to form a hinge without passing across the opening through said sections, means covering said hinges in any position thereof, and relatively flat means at the outer ends of said two first-named sections for support attachment thereby of the respective ends of said chute, said last-named means including annular flanges respectively at the outer ends of said entry and exit sections, said flanges being welded to said conduit sections respectively at selected angles to the axis of said sections and said projecting means being ears having transversely registering openings therethrough at each hinge location respectively, hinge pins passing through said openings on each side of said chute, at least one of said openings on each side of at least one of said hinges being elongated.

6. An adjustable relatively rigid chute adapted to be supported by its ends comprising, in combination, an entry tubular wall conduit section, an exit tubular wall conduit section and at least one tubular wall conduit run section therebetween defining a chute opening therethrough, at least one of said sections being provided with coaxial telescoping portions adapted to change the length of said section and the relative angular position of said portions, a sleeve covering the joint between said telescoping portions, projecting means at the end of each section adjoining another section, said projecting means of each section being integral with and on opposite sides of said wall and pivotally connected substantially only to the adjoining projecting means of the adjoining section to form a hinge without passing across the opening through said sections, means covering said hinges in any position thereof, and relatively flat means at the outer ends of said two first-named sections for support attachment thereby of the respective ends of said chute.

References Cited in the file of this patent

UNITED STATES PATENTS

| | | |
|---|---|---|
| 392,171 | Tromanhouser | Oct. 30, 1888 |
| 439,841 | Hobart | Nov. 4, 1890 |
| 688,897 | Taylor | Dec. 17, 1901 |
| 697,653 | Norton | Apr. 15, 1902 |
| 1,905,824 | Dysthe | Apr. 24, 1933 |
| 2,290,776 | Stillwagon | July 21, 1942 |
| 2,451,438 | Hartmon | Oct. 12, 1948 |
| 2,726,682 | Conroy et al. | Dec. 13, 1955 |
| 2,936,185 | Olsen et al. | May 10, 1960 |

FOREIGN PATENTS

| | | |
|---|---|---|
| 3,893 | Great Britain | Feb. 29, 1892 |
| 32,583 | Sweden | Apr. 3, 1912 |